(12) United States Patent
Ii et al.

(10) Patent No.: US 11,081,912 B2
(45) Date of Patent: Aug. 3, 2021

(54) WIRELESS POWER RECEIVER AND WIRELESS POWER TRANSMISSION SYSTEM

(71) Applicant: TDK CORPORATION, Tokyo (JP)

(72) Inventors: Akihiro Ii, Tokyo (JP); Ryo Miyazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 253 days.

(21) Appl. No.: 15/926,412

(22) Filed: Mar. 20, 2018

(65) Prior Publication Data

US 2018/0287434 A1    Oct. 4, 2018

(30) Foreign Application Priority Data

Mar. 28, 2017 (JP) .............................. JP2017-062333

(51) Int. Cl.
| | | |
|---|---|---|
| *H02J 50/90* | (2016.01) | |
| *H02J 50/12* | (2016.01) | |
| *H02J 7/02* | (2016.01) | |
| *B60L 53/36* | (2019.01) | |
| *B60L 53/38* | (2019.01) | |

(Continued)

(52) U.S. Cl.
CPC ............ *H02J 50/90* (2016.02); *B60L 53/122* (2019.02); *B60L 53/126* (2019.02); *B60L 53/36* (2019.02); *B60L 53/38* (2019.02); *H02J 7/025* (2013.01); *H02J 50/10* (2016.02);
(Continued)

(58) Field of Classification Search
CPC .. H02J 50/90; H02J 50/10; H02J 7/025; H02J 50/12; B60L 53/12; B60L 53/38; B60L 53/36; B60L 2250/16; Y02T 90/125; Y02T 10/7005
See application file for complete search history.

(56) References Cited

U.S. PATENT DOCUMENTS

| | | | | |
|---|---|---|---|---|
| 8,423,223 B2* | 4/2013 | Nakamura | ............ | G05D 1/0225 |
| | | | | 701/22 |
| 8,655,530 B2* | 2/2014 | Ichikawa | ............... | B60K 6/445 |
| | | | | 701/22 |

(Continued)

FOREIGN PATENT DOCUMENTS

| | | |
|---|---|---|
| JP | 2011-254633 A | 12/2011 |
| JP | 2015116023 A | 6/2015 |
| JP | 2015126658 A | 7/2015 |

*Primary Examiner* — Rexford N Barnie
*Assistant Examiner* — Elim Ortiz
(74) *Attorney, Agent, or Firm* — Young Law Firm, P.C.

(57) ABSTRACT

Disclosed herein is a wireless power receiving device including a detection circuit that detects a circuit characteristic value of the power receiving circuit and a position detection circuit that detects a state of the relative position between the power receiving coil and the power transmitting coil. The position detection circuit determines that the power receiving coil exists near the periphery of a position suitable for receiving power when the circuit characteristic value exceeds a first threshold value set between the peak value of the second peak and a detection limit value of the detection circuit, and calculates transmittable power from the wireless power transmitting device based on the circuit characteristic value, when the circuit characteristic value detected by the detection circuit exceeds a second threshold value set between the peak value of the second peak and the peak value of the first peak.

19 Claims, 9 Drawing Sheets

(51) Int. Cl.
    *H02J 50/10*         (2016.01)
    *B60L 53/122*       (2019.01)
    *B60L 53/126*       (2019.01)

(52) U.S. Cl.
    CPC ........... *B60L 2250/16* (2013.01); *H02J 50/12* (2016.02); *Y02T 10/70* (2013.01); *Y02T 90/12* (2013.01)

(56) References Cited

U.S. PATENT DOCUMENTS

| | | | | |
|---|---|---|---|---|
| 2009/0079271 A1* | 3/2009 | Jin | .......................... | H02J 50/70 307/104 |
| 2011/0241440 A1* | 10/2011 | Sakoda | ................. | B60L 53/122 307/104 |
| 2012/0091959 A1* | 4/2012 | Martin | .................... | B60L 53/38 320/109 |
| 2013/0037365 A1* | 2/2013 | Ichikawa | ................ | B60L 50/16 191/10 |
| 2013/0193749 A1* | 8/2013 | Nakamura | ........... | H04B 5/0037 307/9.1 |
| 2014/0145517 A1* | 5/2014 | Ogasawara | ............. | H01F 38/14 307/104 |
| 2014/0333128 A1 | 11/2014 | Ichikawa | | |
| 2017/0001532 A1 | 1/2017 | Taniguchi | | |

\* cited by examiner

WIRELESS POWER RECEIVER AND WIRELESS POWER TRANSMISSION SYSTEM

BACKGROUND OF THE INVENTION

Field of the Invention

The present invention relates to a wireless power receiving device and a wireless power transmission system.

Description of Related Art

There is known a wireless power transmission technology that uses magnetic coupling between a power transmitting (primary) coil and a power receiving (secondary) coil which are opposed to each other to transmit AC current energy applied to the power transmitting coil to the power receiving coil by wireless.

In performing power transmission by the wireless power transmission technology, it is necessary to achieve alignment between a wireless power transmitting device including the power transmitting coil and a wireless power receiving device including the power receiving coil. For example, assuming that the wireless power transmitting device is a charging facility buried underground and that the wireless power receiving device is disposed on the bottom surface of a vehicle such as an electric car, it is necessary to position the vehicle on the charging facility by driver's manual control of the vehicle or system's automatic control of the vehicle.

To use a mechanical guide can be considered as a concrete method for realizing the positioning. For example, when a guide rail for guiding the wheels of the vehicle is provided, the vehicle can be easily moved to a proper position. However, the mechanical guide is not always available, so that there is a need to enable positioning even in the absence of the mechanical guide. Under such circumstances, the following system has been considered. That is, a magnetic flux generated from the power transmitting coil is detected by the wireless power receiving device, and the relative positional relationship between the wireless power transmitting device and the wireless power receiving device is calculated in real time from the detection result so as to be used in the positioning.

Japanese Patent Application Laid-Open No. 2015-116023 discloses an example of such a positioning technology. Specifically, a driver performs parking operation in a state where the output of a primary coil is fixed. During the parking operation, if a receiving voltage received by the wireless power receiving device is measured, an image (see FIG. 10A of the document) representing that the received voltage of the wireless power receiving device is being measured is displayed on a display device such as a car navigation system. Then, at a timing when the received voltage of the wireless power receiving device is changed from an increase to a decrease, an image (see FIG. 10B of the document) representing that the vehicle is at the optimum parking position is displayed.

Further, Japanese Patent Application Laid-Open No. 2015-126658 describes the relationship between a separation distance between a power transmitting coil and a power receiving coil in the horizontal direction (hereinafter, referred to merely as "horizontal separation distance") and a received voltage received by the wireless power receiving device in a state where the output of the power transmitting coil is fixed. As illustrated in FIG. 4 of the document, the received voltage of the wireless power receiving device has the local minimum value at a position where the horizontal separation distance assumes a predetermined value. The local minimum value occurs due to reversal of the direction of a magnetic flux interlinking the power receiving coil.

SUMMARY

It is therefore an object of the present invention to provide a wireless power receiving device and a wireless power transmission system capable of notifying a user that the wireless power receiving device is approaching the wireless power transmitting device adequately.

A wireless power receiving device according to the present invention is a device that is mounted in a mobile body and configured to receive power transmitted from a wireless power transmitting device by wireless. The wireless power receiving device includes a power receiving circuit including a power receiving coil that takes in AC power through a magnetic field and a rectifying circuit that converts the AC power received by the power receiving coil into DC power and outputs the DC power to a load, a detection circuit that detects a circuit characteristic value of the power receiving circuit having a first peak having a relatively large peak value and a second peak having a relatively small value with respect to a horizontal separation distance between the power transmitting coil of the wireless power transmitting device and the power receiving coil, and a position detection circuit that detects a state of the relative position between the power receiving coil and the power transmitting coil. When the circuit characteristic value detected by the detection circuit exceeds a first threshold value set between the peak value of the second peak and a detection limit value of the detection circuit, the position detection circuit determines that the power receiving coil exists near the periphery of a position suitable for receiving power from the power transmitting coil. When the circuit characteristic value detected by the detection circuit exceeds a second threshold value set between the peak value of the second peak and the peak value of the first peak, the position detection circuit calculates transmittable power from the wireless power transmitting device based on the circuit characteristic value detected by the detection circuit.

A wireless power transmission system according to the present invention is a system that transmits power from a wireless power transmitting device to a wireless power receiving device by wireless, wherein the wireless power transmitting device includes a power conversion circuit that converts input DC power into AC power, a power transmitting coil that receives the AC power supplied from the power conversion circuit to generate an AC magnetic field, and a control circuit that controls the AC power to be supplied to the power transmitting coil, and the wireless power receiving device is the above wireless power receiving device.

A wireless power transmission system according to another aspect of the present invention is a system that transmits power from a wireless power transmitting device to a wireless power receiving device by wireless, wherein the wireless power transmitting device includes a power conversion circuit that converts input DC power into AC power, a power transmitting coil that receives the AC power supplied from the power conversion circuit to generate an AC magnetic field, and a control circuit that controls the AC power to be supplied to the power transmitting coil, and the wireless power receiving device includes a power receiving circuit including a power receiving coil that takes in AC power through the AC magnetic field and a rectifying circuit that converts the AC power received by the power receiving coil into DC power and outputs the DC power to a load, and a detection circuit that detects a circuit characteristic value of the power receiving circuit having a first peak having a relatively large peak value and a second peak having a relatively small value with respect to a horizontal separation distance between the power transmitting coil of the wireless power transmitting device and the power receiving coil. When the circuit characteristic value detected by the detection circuit exceeds a first threshold value set between the peak value of the second peak and a detection limit value of the detection circuit, the control circuit determines that the power receiving coil exists near the periphery of a position suitable for receiving power from the power transmitting coil. When the circuit characteristic value detected by the detection circuit exceeds a second threshold value set between the peak value of the second peak and the peak value of the first peak, the control circuit calculates transmittable power from the wireless power transmitting device to the wireless power receiving device based on the circuit characteristic value detected by the detection circuit.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

First, the finding of the inventor's study will be explained before explaining embodiments of the present invention.

Figure 4:
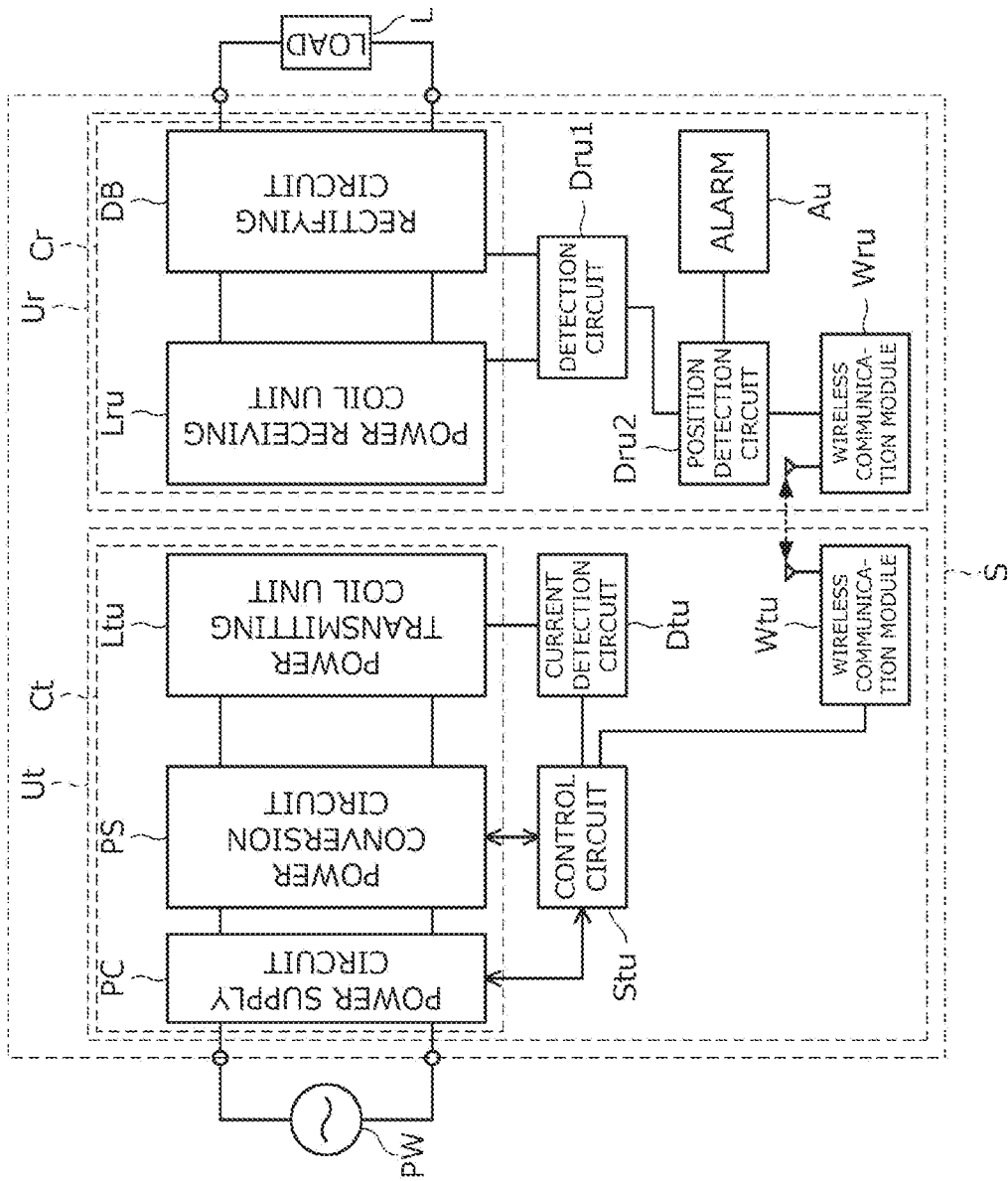
FIG. 4 is a view illustrating the configuration of a wireless power transmission system S according to the first embodiment of the present invention.

As can be seen from FIG. 4 of Japanese Patent Application Laid-Open No. 2015-126658, the received voltage of the wireless power receiving device in a state where the output of the power transmitting coil is fixed has two peaks having different values. One is a larger peak that appears at a position where the horizontal separation distance is substantially "0". The larger peak is hereinafter referred to as "first peak". The other is a smaller peak that appears at a position across one local minimum value as viewed from the first peak. The smaller peak is hereinafter referred to as "second peak".

Although not specified in Japanese Patent Application Laid-Open No. 2015-116023, in the technique disclosed in the document, it is likely that a threshold value for the received voltage is set to a value larger than the peak value of the second peak, and when the received voltage exceeds the threshold value, the image representing that the received voltage of the wireless power receiving device is being measured is displayed. This is because if the threshold value is set to a value smaller than the peak value of the second peak, an image representing that the vehicle is at the optimum parking position is displayed when the received voltage exceeds the second peak.

However, in the above-described configuration in which a fact that the wireless power receiving device is approaching the wireless power transmitting device is not notified to a driver until the received voltage exceeds the threshold value set to a value larger than the peak value of the second peak, the driver cannot confirm that the wireless power receiving device is approaching the wireless power transmitting device until the wireless power receiving device significantly approaches the wireless power transmitting device.

The object of the present invention is therefore to provide a wireless power receiving device and a wireless power transmission system capable of notifying a user that the wireless power receiving device is approaching the wireless power transmitting device at a time point when the wireless power receiving device is located at a position farther than the conventional position of the wireless power receiving device with respect to the wireless power transmitting device.

Preferred embodiments of the present invention will now be explained in detail with reference to the drawings.

Figure 1:
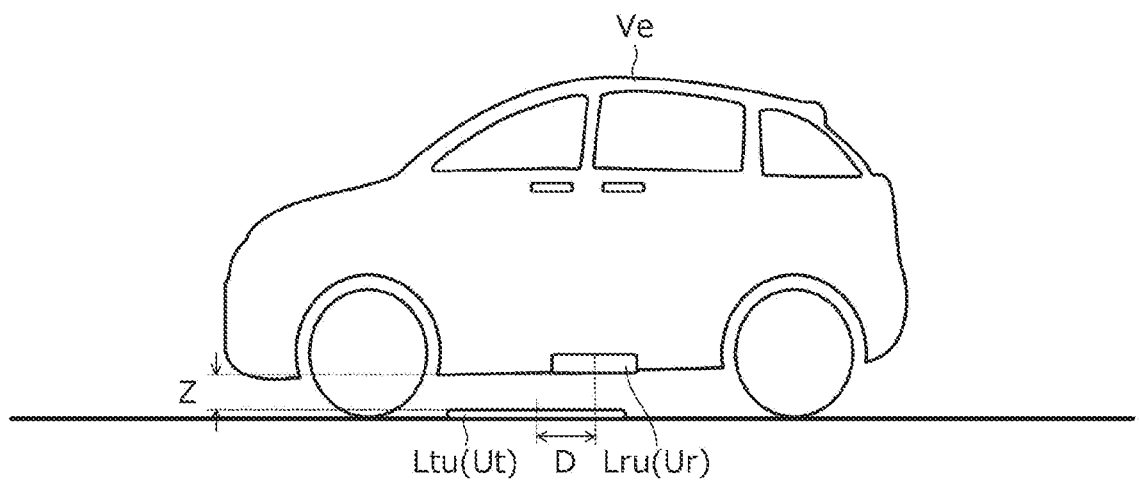
FIG. 1 is a view illustrating a use state of a wireless power transmission system according to a first embodiment of the present invention.

FIG. 1 is a view illustrating a use state of a wireless power transmission system according to an embodiment of the present invention. As illustrated, the wireless power transmission system according to the embodiment is constituted of a wireless power transmitting device Ut including a power transmitting coil unit Ltu and a wireless power receiving device Ur including a power receiving coil unit Lru. The power transmitting coil unit Ltu is a device installed on a road surface and includes a power transmitting coil (not illustrated). The power receiving coil unit Lru is a device installed on the bottom surface of a vehicle Ve and includes a power receiving coil (not illustrated). The vehicle Ve is, e.g., an electric car.

When performing the charging of the vehicle Ve, a user moves the vehicle Ve to a location above the power transmitting coil unit Ltu to dispose the power receiving coil unit Lru in a magnetic field generated by the transmitting coil. As a result, power is transmitted from the wireless power transmitting device Ut to the wireless power receiving device Ur through magnetic coupling between the power transmitting coil and the power receiving coil, and a secondary battery (not illustrated) in the vehicle Ve is charged by the thus transmitted power.

The relative positional relationship between the power transmitting coil and the power receiving coil is represented by a vertical separation distance Z and a horizontal separation distance D illustrated in FIG. 1. The vertical separation distance Z is generally determined by the bottom face height of the vehicle Ve. That is, the higher the bottom face height of the vehicle Ve, the larger the distance between the power receiving coil and the road surface, i.e., the vertical separation distance Z becomes. On the other hand, the horizontal separation distance D becomes smaller as the vehicle Ve becomes closer to the power transmitting coil unit Ltu and becomes larger as the vehicle Ve becomes far from the power transmitting coil unit Ltu.

Figure 2:
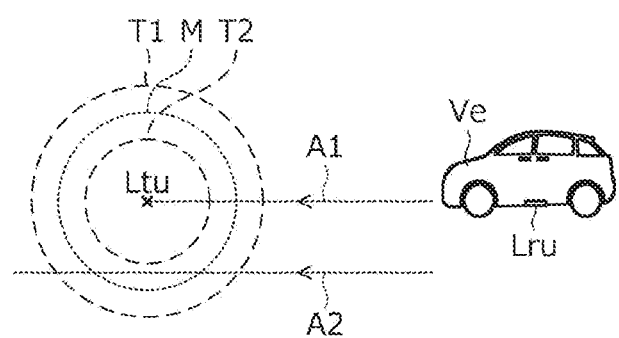
FIG. 2 is a view schematically illustrating movement of the vehicle Ve when the charging of the vehicle Ve shown in FIG. 1 is performed.

FIG. 2 is a view schematically illustrating movement of the vehicle Ve when the charging of the vehicle Ve is performed. As illustrated, a user (driver) of the vehicle Ve moves the vehicle Ve along the arrow A1 such that the vehicle Ve is positioned just above the power transmitting coil unit Ltu. At this time, the horizontal separation distance D illustrated in FIG. 1 is reduced as the vehicle Ve approaches the power transmitting coil unit Ltu and becomes "0" in a state where the vehicle Ve is positioned just above the power transmitting coil unit Ltu. The arrow A2 illustrated in FIG. 2 indicates an example of failure in alignment, the details of which will be described later.

Figure 3:
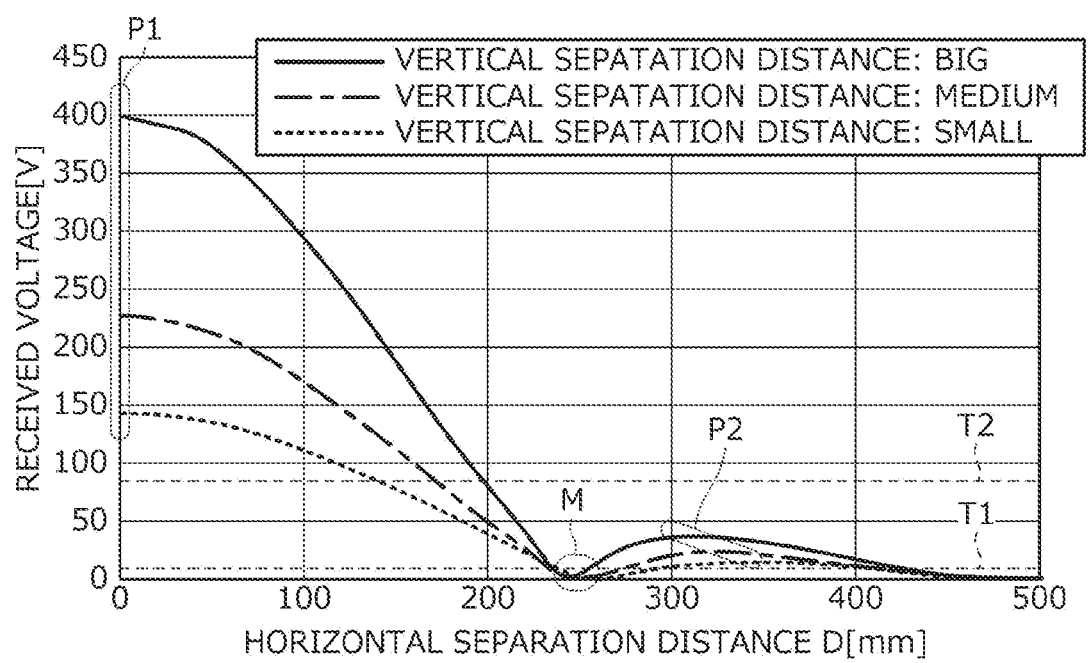
FIG. 3 is a graph illustrating the relationship between the horizontal separation distance D and a received voltage which is generated in the wireless power receiving device Ur when a magnetic flux generated by the power transmitting coil interlinks the power receiving coil.

FIG. 3 is a graph illustrating the relationship between the horizontal separation distance D and a received voltage (specifically, the output voltage of a rectifying circuit DB of FIG. 4) which is generated in the wireless power receiving device Ur when a magnetic flux generated by the power transmitting coil interlinks the power receiving coil. The data of the graph of FIG. 3 is obtained with the output of the power transmitting coil fixed.

As illustrated in FIG. 3, the received voltage in a state where the output of the power transmitting coil is fixed has two peaks having different values. A larger peak P1 (first peak) appears at a position where the horizontal separation distance D is substantially "0". A smaller peak P2 (second peak) appears at a position across a local minimum value M as viewed from the peak P1. The peak value of each of the peaks P1 and P2 increases as the vertical separation distance Z decreases.

The local minimum value M appears at a position where the direction of a magnetic flux interlinking the power receiving coil is reversed. As illustrated in FIG. 3, the value of horizontal separation distance D corresponding to the appearance position of the local minimum value M remains almost the same even when the vertical separation distance Z is changed.

Although the details will be described later, the wireless power receiving device Ur uses threshold values T1 and T2 illustrated in FIG. 3 so as to execute processing according to the present invention. The threshold value T1 (first threshold value) is set between the peak value of the peak P2 and a detection limit value (lower limit value in the present embodiment) of a detection circuit Dru1. The threshold value T2 (second threshold value) is set between the peak value of the peak P2 and the peak value of the peak P1.

In the present embodiment, the peaks P1 and P2 each assume a local maximum value, so that the thus set threshold values T1 and T2 are a value smaller than the peak value of the peak P2 and a value larger than the peak value of the peak P2 but smaller than the peak value of the peak P1, respectively. However, the peaks P1 and P2 may each assume a local minimum value depending on the type of a circuit characteristic value to be described later. In such a case, the threshold values T1 and T2 are a value larger than the peak value of the peak P2 and a value smaller than the peak value of the peak P2 but larger than the peak value of the peak P1, respectively.

Referring back to FIG. 2, positions at which the received voltage assumes the local minimum value M and threshold values T1 and T2 spread concentrically around the power transmitting coil unit Ltu. The radii of the concentric circles are reduced in the order of the threshold value T1, local minimum value M, and threshold value T2. Thus, when the vehicle Ve approaches the power transmitting coil unit Ltu, the value of the received voltage is inevitably changed in the order of the threshold value T1, local minimum value M, and threshold value T2. The wireless power receiving device Ur according to the present embodiment uses such a property of the received voltage to allow approach of the wireless power receiving device Ur to the wireless power transmitting device Ut to be notified to a user at a time point when the wireless power receiving device Ur is located at a position farther than the conventional position of the wireless power receiving device with respect to the wireless power transmitting device Ut. Hereinafter, the configuration of the wireless power receiving device Ur will be described in detail.

FIG. 4 is a view illustrating the configuration of a wireless power transmission system S according to the present embodiment. As illustrated, the wireless power transmission system S according to the present embodiment includes the wireless power transmitting device Ut and wireless power receiving device Ur.

The wireless power receiving device Ur is a device mounted on a mobile body and configured to receive power transmitted from the wireless power transmitting device Ut by wireless. The wireless power receiving device Ur includes, in addition to the power receiving coil unit Lru illustrated in FIG. 1, a rectifying circuit DB, a detection circuit Dru1, a position detection circuit Drug, an alarm Au, and a wireless communication module Wru. The power receiving coil unit Lru and rectifying circuit DB constitute a power receiving circuit Cr of the wireless power receiving device Ur.

The power receiving coil unit Lru includes a power receiving coil that takes in AC power through a magnetic field generated by the power transmitting coil unit Ltu. The rectifying circuit DB is a circuit that converts power received by the power receiving coil into DC power. The DC power generated by the rectifying circuit DB is supplied to a load L. The load L is, e.g., a secondary battery provided in the vehicle Ve illustrated in FIG. 1.

The detection circuit Dru1 is a circuit that detects a circuit characteristic value of the power receiving circuit Cr. The circuit characteristic value may be a value having the above-mentioned peaks P1 and P2 with respect to the horizontal separation distance D and is, typically, the output voltage (received voltage) of the rectifying circuit DB.

The alarm Au (power receiving side alarm) is a device that notifies a user or an external device (not illustrated) of information. Information notified by the alarm Au includes a determination result (to be described later) of the position detection circuit Dru2 and a transmittable power (to be described later) calculated by the position detection circuit Dru2. A concrete notification method will be described later. A user moves the vehicle Ve so as to align the power transmitting coil and the power receiving coil based on the thus notified information. The external device is a device that manages an automatic operation function of the vehicle Ve. Like the user's manual operation, the external device moves the vehicle Ve so as to align the power transmitting coil and the power receiving coil based on the thus notified information.

The wireless communication module Wru is a module having a wireless communication function and is configured to perform wireless communication with a wireless communication module Wtu (to be described later) in the wireless power transmitting device Ut. Near-field wireless communication schemes, such as wireless LAN or Bluetooth® can be suitably used between the above modules. The role of the wireless communication module Wru will be described later together with explanation of the configuration of the wireless power transmitting device Ut.

The position detection circuit Dru2 is a circuit for grasping a state of the relative position between the power receiving coil and the power transmitting coil. Specifically, the position detection circuit Dru2 is configured to grasp a state of the relative position between the power receiving coil and the power transmitting coil by using the threshold values T1 and T2 illustrated in FIG. 3. Hereinafter, processing performed by the position detection circuit Dru2 will be described. While the position detection circuit Dru2 is carrying out the following processing, the wireless power transmitting device Ut controls the amount of magnetic flux generated from the power transmitting coil constant. Details of the control performed by the wireless power transmitting device Ut will be described later.

When the circuit characteristic value detected by the detection circuit Dru1 exceeds the threshold value T1, the position detection circuit Dru2 determines that the power receiving coil exists near the periphery of a position suitable for receiving power from the power transmitting coil. Then, the position detection circuit Dru2 uses the alarm Au to notify the user or external device of the determination result. Specifically, preferably the position detection circuit Dru2 performs a first display (e.g., lighting) corresponding to a determination result indicating that the power receiving coil exists near the periphery of a position suitable for receiving power from the power transmitting coil; while it performs a second display (e.g., light-off) corresponding to a determination result indicating that the power receiving coil does not exist near the periphery of a position suitable for receiving power from the power transmitting coil.

As the threshold value T1, a detection lower limit value for the detection circuit Dru1 (the minimum circuit characteristic value that the detection circuit Dru1 can detect) may be used. In this case, when the circuit characteristic value is detected by the detection circuit Dru1, the position detection circuit Dru2 determines that the power receiving coil exists near the periphery of a position suitable for receiving power from the power transmitting coil.

When the circuit characteristic value detected by the detection circuit Dru1 exceeds the threshold value T2, the position detection circuit Dru2 calculates a transmittable power from the wireless power transmitting device Ut based on the circuit characteristic value detected by the detection circuit Dru1. Then, the position detection circuit Dru2 uses the alarm Au to notify the user or external device of the calculated transmittable power. Specifically, the position detection circuit Dru2 preferably performs the notification by displaying a bar-type indicator.

Further, the position detection circuit Dru2 performs processing of determining that alignment between the power transmitting coil and the power receiving coil is not performed properly when the circuit characteristic value detected by the detection circuit Dru1 does not exceed the threshold value T2 within a predetermined time period from when it exceeds the threshold value T1. Alternatively, in case where vehicle speed information based on a vehicle speed pulse or position information based on GPS satellites can be obtained, it may be determined that alignment between the power transmitting coil and the power receiving coil is not properly performed when the circuit characteristic value detected by the detection circuit Dru1 does not exceed the threshold value T2 during a time period from when it exceeds the threshold value T1 to when the vehicle Ve is moved by a predetermined distance.

A case where the circuit characteristic value does not exceed the threshold value T2 can occur when, for example, the vehicle Ve is moved along the arrow A2 illustrated in FIG. 2. That is, when the vehicle Ve is moved along the arrow A2, the circuit characteristic value by no means exceeds the threshold value T2 even after exceeding the threshold value T1. In such a case, the position detection circuit Dru2 determines that alignment between the power transmitting coil and the power receiving coil is not properly performed.

When determining that alignment between the power transmitting coil and the power receiving coil is not performed properly, the position detection circuit Dru2 may notify the user or external device of the failure using the alarm Au. This allows the user or external device to grasp that alignment between the power transmitting coil and the power receiving coil is not performed properly and to perform subsequent correspondence processing such as retry of the alignment from the beginning as needed.

Figure 5:
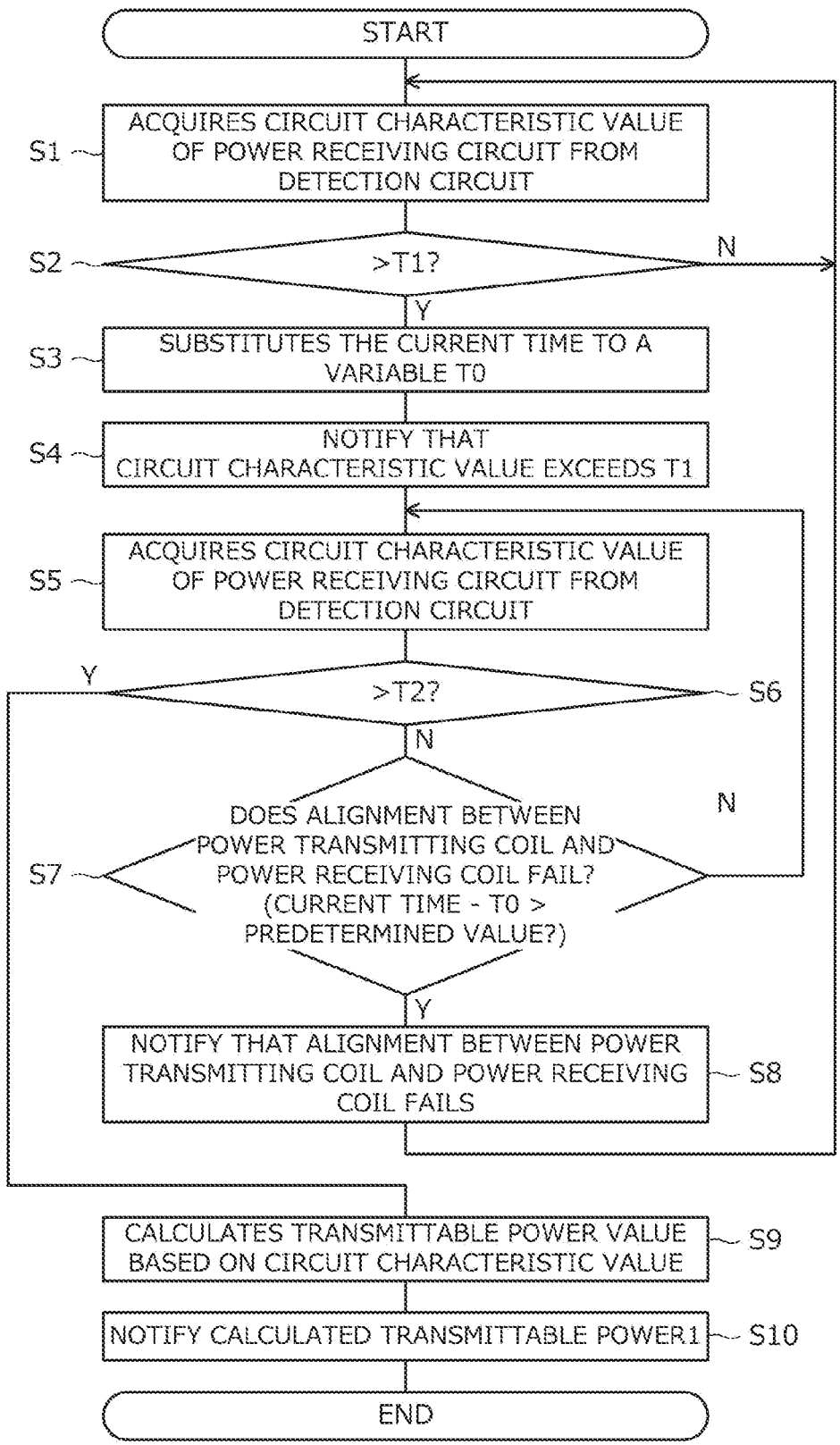
FIG. 5 is a flowchart illustrating a processing flow of the position detection circuit Dru2 shown in FIG. 4.

FIG. 5 is a flowchart illustrating a processing flow of the position detection circuit Dru2. Hereinafter, the processing performed by the position detection circuit Dru2 will be described in more detail with reference to FIG. 5.

As illustrated in FIG. 5, the position detection circuit Dru2 acquires the circuit characteristic value of the power receiving circuit Cr from the detection circuit Dru1 (step S1) and determines whether or not the acquired circuit characteristic value exceeds the threshold value T1 (step S2). When determining that the circuit characteristic value does not exceed the threshold value T1, the position detection circuit Dru2 returns to step S1 and acquires the circuit characteristic value once again. On the other hand, when determining that the circuit characteristic value exceeds the threshold value T1, the position detection circuit Dru2 substitutes the current time to a variable T0 (step S3) and uses the alarm Au to notify that the circuit characteristic value exceeds the threshold value T1 (step S4).

Subsequently, the position detection circuit Dru2 acquires the circuit characteristic value of the power receiving circuit Cr once again from the detection circuit Dru1 (step S5) and then determines whether or not the acquired circuit characteristic value exceeds the threshold value T2 (step S6). When determining that the acquired circuit characteristic value does not exceed the threshold value T2, the position detection circuit Dru2 determines whether or not the alignment between the power transmitting coil and power receiving coil fails (is not performed properly) (step S7). Specifically, in FIG. 5, it is determined whether or not a difference between the current time and variable T0 exceeds a predetermined value. That is, it is determined whether or not a predetermined time elapses from when the circuit characteristic value exceeds the threshold value T1; alternatively, as described above, it may be determined whether or not the vehicle Ve is moved by a predetermined distance from when the circuit characteristic value exceeds the threshold value T1.

When determining in step S7 that alignment between the power transmitting coil and the power receiving coil fails (when a difference between the current time and variable T0 exceeds a predetermined value), the position detection circuit Dru2 uses the alarm Au to notify that the alignment between the power transmitting coil and the power receiving coil fails (step S8). Then, the position detection circuit Dru2 returns to step S1 and acquires the circuit characteristic value once again. The processing flow may return directly to step S1 after the affirmative determination (YES) in step S7 with the processing of step S8 skipped. This corresponds to simply resetting the processing of the position detection circuit Dru2. On the other hand, when determining in step S7 that alignment between the power transmitting coil and the power receiving coil does not fail (when a difference between the current time and variable T0 does not exceed a predetermined value), the position detection circuit Dru2 returns to step S4 and acquires the circuit characteristic value once again.

When determining in step S5 that the circuit characteristic value exceeds the threshold value T2, the position detection circuit Dru2 calculates a transmittable power value based on the latest circuit characteristic value acquired in step S5 (step S9). Specifically, a transmittable power corresponding to the latest circuit characteristic value acquired in step S5 may be read out from a previously prepared look-up table between the circuit characteristic value and the transmittable power. Then, the position detection circuit Dru2 uses the alarm Au to perform notification of the calculated transmittable power.

As described above, with the wireless power receiving device Ur in the present embodiment, processing for starting power transmission (i.e., processing of calculating the transmittable power from the wireless power transmitting device Ut based on the circuit characteristic value) is started after the circuit characteristic value exceeds the threshold value T2. Thus, in a state where the wireless power receiving device Ur is approaching the wireless power transmitting device Ut, it is possible to notify the user of approach to the wireless power transmitting device Ut at a time point when the circuit characteristic value exceeds the threshold value T1 (that is, when the wireless power receiving device Ur is located at a position farther than the conventional notification start position of the wireless power receiving device Ur with respect to the wireless power transmitting device Ut).

Further, when the threshold value T1 is set to the detection lower limit value for the detection circuit Dru1, it is possible to widen a range where approach to the wireless power transmitting device Ut can be notified to the user to a maximum extent.

Further, it can be determined that alignment between the power transmitting coil and the power receiving coil is not properly performed when the circuit characteristic value detected by the detection circuit Dru1 does not exceed the threshold value T2 within a predetermined time period from when it exceeds the threshold value T1 (or during a time period from when it exceeds the threshold value T1 to when the vehicle Ve is moved by a predetermined distance). Thus, the user can grasp that alignment between the power transmitting coil and the power receiving coil fails.

Further, the determination result (specifically, whether or not the circuit characteristic value exceeds the threshold value T1) of the position detection circuit Dru2 and the transmittable power calculated by the position detection circuit Dru2 can be notified to the user or external device by using the alarm Au, allowing the user or external device to guide the vehicle Ve to a position where the power transmitting coil and the power receiving coil directly face each other.

Referring back to FIG. 4, the configuration of the wireless power transmitting device Ut will be described. The wireless power transmitting device Ut includes, in addition to the power transmitting coil unit Ltu shown also in FIG. 1, a power supply circuit PC, a power conversion circuit PS, a control circuit Stu, a current detection circuit Dtu, and a wireless communication module Wtu. The power supply circuit PC, power conversion circuit PS, and power transmitting coil unit Ltu constitute a power transmitting circuit Ct of the wireless power transmitting device Ut.

The power supply circuit PC is a circuit that converts AC power supplied from an external power supply PW which is, e.g., a commercial AC power supply into desired DC power and outputs the DC power and is constituted by, e.g., a PFC (Power Factor Correction) circuit or a stabilizing power supply.

The power conversion circuit PS is a circuit that converts the DC power supplied from the power supply circuit PC into AC power of a predetermined driving frequency and is specifically a switching power supply including a plurality of switching elements. The switching elements are bridge-connected to one another. Examples of the switching element include a MOS-FET (Metal Oxide Semiconductor-Field Effect Transistor) and an IGBT (Insulated Gate Bipolar Transistor).

The power transmitting coil unit Ltu includes the power transmitting coil that receives AC power from the power conversion circuit PS to generate an AC magnetic field. When the AC power generated by the power conversion circuit PS is supplied to both ends of the power transmitting coil, an AC current flows in the power transmitting coil, whereby the AC magnetic field is generated around the power transmitting coil. When the power receiving coil enters the AC magnetic field, an induced current flows in the power receiving coil. Thus, power transmission from the wireless power transmitting device Ut to the wireless power receiving device Ur is realized. The power transmitting coil unit Ltu may include a capacitor connected to the power transmitting coil and constituting a resonance circuit together with the power transmitting coil.

The current detection circuit Dtu is a circuit that detects a value (hereinafter, referred to as "power transmitting coil current value") of current flowing in the power transmitting coil included in the power transmitting coil unit Ltu. The current detection circuit Dtu outputs the detected power transmitting coil current value to the control circuit Stu.

The wireless communication module Wtu is a module that has a wireless communication function and is configured to perform wireless communication with the wireless communication module Wru in the wireless power receiving device Ur. The position detection circuit Drug of the wireless power receiving device Ur is configured to transmit, through the wireless communication, the circuit characteristic value (e.g., the output voltage of the rectifying circuit DB) detected by the detection circuit Dru1 in response to a request transmitted from the control circuit Stu through the wireless communication.

The control circuit Stu is a circuit that calculates a relative positional relationship (specifically, the above-mentioned separation distances Z and D) between the power transmitting coil and the power receiving coil, calculates a transmittable power from the calculated relative positional relationship, and controls operation of the power transmitting circuit Ct based on the calculated transmittable power. Further, the control circuit Stu transmits the calculated vertical separation distance Z to the wireless power receiving device Ur. Hereinafter, with reference to the flowchart of FIG. 6, the function of the control circuit Stu will be described in detail.

Figure 6:
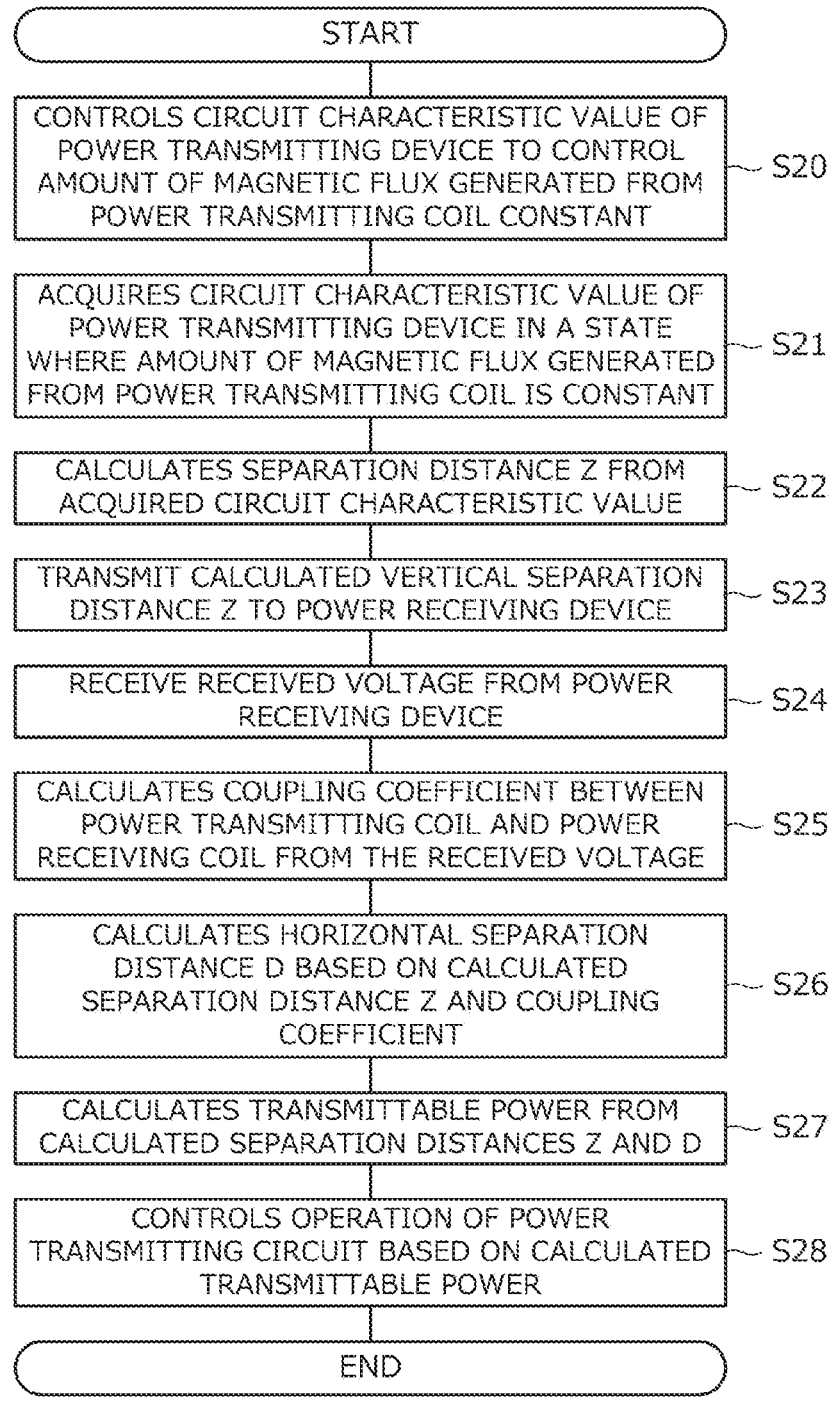
FIG. 6 is a flowchart illustrating a processing flow of the control circuit Stu shown in FIG. 4.

FIG. 6 is a flowchart illustrating a processing flow of the control circuit Stu. The control circuit Stu controls the circuit characteristic value of the wireless power transmitting device Ut to control the amount of magnetic flux generated from the power transmitting coil constant (step S20). The processing of the position detection circuit Drug described in the first embodiment is executed in a state where the amount of magnetic flux generated from the power transmitting coil is thus controlled constant. Examples of the circuit characteristic value include various values such as an output DC current of the power supply circuit PC, an output DC voltage of the power supply circuit PC, DC power supplied from the power supply circuit PC to the power conversion circuit PS, a frequency of AC power generated by the power conversion circuit PS, and a time ratio (ON/OFF duty) of the plurality of switching elements constituting the power conversion circuit PS.

In case that the output DC current of the power supply circuit PC, output DC voltage of the power supply circuit PC, or DC power supplied from the power supply circuit PC to the power conversion circuit PS is used as the circuit characteristic value of the wireless power transmitting device Ut, the control circuit Stu controls the power supply circuit PC to thereby control the circuit characteristic value of the wireless power transmitting device Ut. On the other hand, in case that the frequency (the above-mentioned driving frequency) of AC power generated by the power conversion circuit PS or time ratio (ON/OFF duty) of the plurality of switching elements constituting the power conversion circuit PS is used as the circuit characteristic value of the wireless power transmitting device Ut, the control circuit Stu controls the power conversion circuit PS to thereby control the circuit characteristic value of the wireless power transmitting device Ut.

Further, the control circuit Stu uses the above-mentioned power transmitting coil current value as a monitoring value used for grasping whether or not the amount of magnetic flux generated from the power transmitting coil in the power transmitting coil unit Ltu is constant or not. That is, the control circuit Stu controls the circuit characteristic value of the wireless power transmitting device Ut so as to make the power transmitting coil current value constant to thereby control the amount of magnetic flux generated from the power transmitting coil constant. It can be said that the amount of magnetic flux generated from the power transmitting coil is constant when the power transmitting coil current value is constant, so that it is possible to control the amount of magnetic flux generated from the power transmitting coil by this control. Although the power transmitting coil current value detected by the current detection circuit Dtu is used in order to grasp whether or not the amount of magnetic flux generated from the power transmitting coil in the power transmitting coil unit Ltu is constant in the present embodiment, other methods capable of grasping whether or not the amount of magnetic flux generated from the power transmitting coil is constant may be used.

Then, the control circuit Stu acquires the circuit characteristic value of the wireless power transmitting device Ut in a state where the amount of magnetic flux generated from the power transmitting coil is constant (step S21). The circuit characteristic value acquired here is the same as the circuit characteristic value to be controlled in step S2. Then, the control circuit Stu calculates the vertical separation distance Z from the acquired circuit characteristic value (step S22). The inductance value of the power transmitting coil changes depending on the vertical separation distance Z, and the change in inductance value of the power transmitting coil is reflected on the circuit characteristic value required for controlling the amount of magnetic flux generated from the power transmitting coil constant, so that the control circuit Stu can calculate the vertical separation distance Z based on the circuit characteristic value acquired in step S21. Specifically, a vertical separation distance Z corresponding to the acquired circuit characteristic value is read out from a previously prepared look-up table between the circuit characteristic value and the vertical separation distance Z.

Subsequently, the control circuit Stu uses the wireless communication module Wtu to transmit the calculated vertical separation distance Z to the wireless power receiving device Ur (step S23). Processing performed by the wireless power receiving device Ur after receiving the calculated vertical separation distance Z will be described later.

Then, the control circuit Stu uses the wireless communication module Wtu to receive the circuit characteristic value (e.g., output voltage of the rectifying circuit DB) from the wireless power receiving device Ur (step S24) and then calculates the coupling coefficient between the power transmitting coil and the power receiving coil from the received circuit characteristic value (step S25).

Subsequently, the control circuit Stu calculates the horizontal separation distance D based on the vertical separation distance Z calculated in step S22 and coupling coefficient calculated in step S25 (step S26). The coupling coefficient changes depending on the horizontal separation distance D if the calculated vertical separation distance Z is not changed, so that the control circuit Stu can calculate the horizontal separation distance D based on the vertical separation distance Z and the coupling coefficient. Specifically, look-up tables between the coupling coefficient and the horizontal separation distance D are previously prepared for each vertical separation distance Z, and a look-up table corresponding to the vertical separation distance Z calculated in step S22 is read out. Then, the horizontal separation distance D corresponding to the coupling coefficient calculated in step S25 is read out from that look-up table.

Then, the control circuit Stu calculates the transmittable power from the calculated separation distances Z and D (step S27). Specifically, a transmittable power corresponding to the calculated separation distances Z and D is read out from a previously prepared look-up table between the separation distances Z and D and the transmittable power.

Finally, the control circuit Stu controls the operation of the power transmitting circuit Ct based on the calculated transmittable power (step S28). Specifically, the control circuit Stu controls the operation of one of the power supply circuit PC and the power conversion circuit PS to realize transmission by the transmittable power calculated in step S27. Thus, the power transmission to the wireless power receiving device Ur is performed with power suitable for the relative positional relationship between the power transmitting coil and the power receiving coil.

Referring back to FIG. 4, the position detection circuit Dru2 of the wireless power receiving device Ur is configured to receive the vertical separation distance Z transmitted in step S23. The position detection circuit Dru2 changes the threshold value T2 in accordance with the received calculated vertical separation distance Z. Specifically, the position detection circuit Dru2 reduces the threshold value T2 as the vertical separation distance Z becomes larger. This processing corresponds to a fact that the larger the vertical separation distance Z is, the smaller the received voltage becomes, as illustrated in FIG. 3. This allows the threshold value T2 to adapt to a change in the peak value of the peak P2 in accordance with the vertical separation distance Z.

As described above, with the wireless power transmission system S in the present embodiment, the amount of magnetic flux generated from the power transmitting coil can be controlled to be constant. Thus, the characteristics illustrated in FIG. 3 can be obtained to allow the processing of the position detection circuit Dru2 to be suitably performed.

Further, the threshold value T2 can be changed in accordance with the calculated vertical separation distance Z, allowing the threshold value T2 to adapt to a change in the peak value of the peak P2 in accordance with the vertical separation distance Z.

Figure 7:
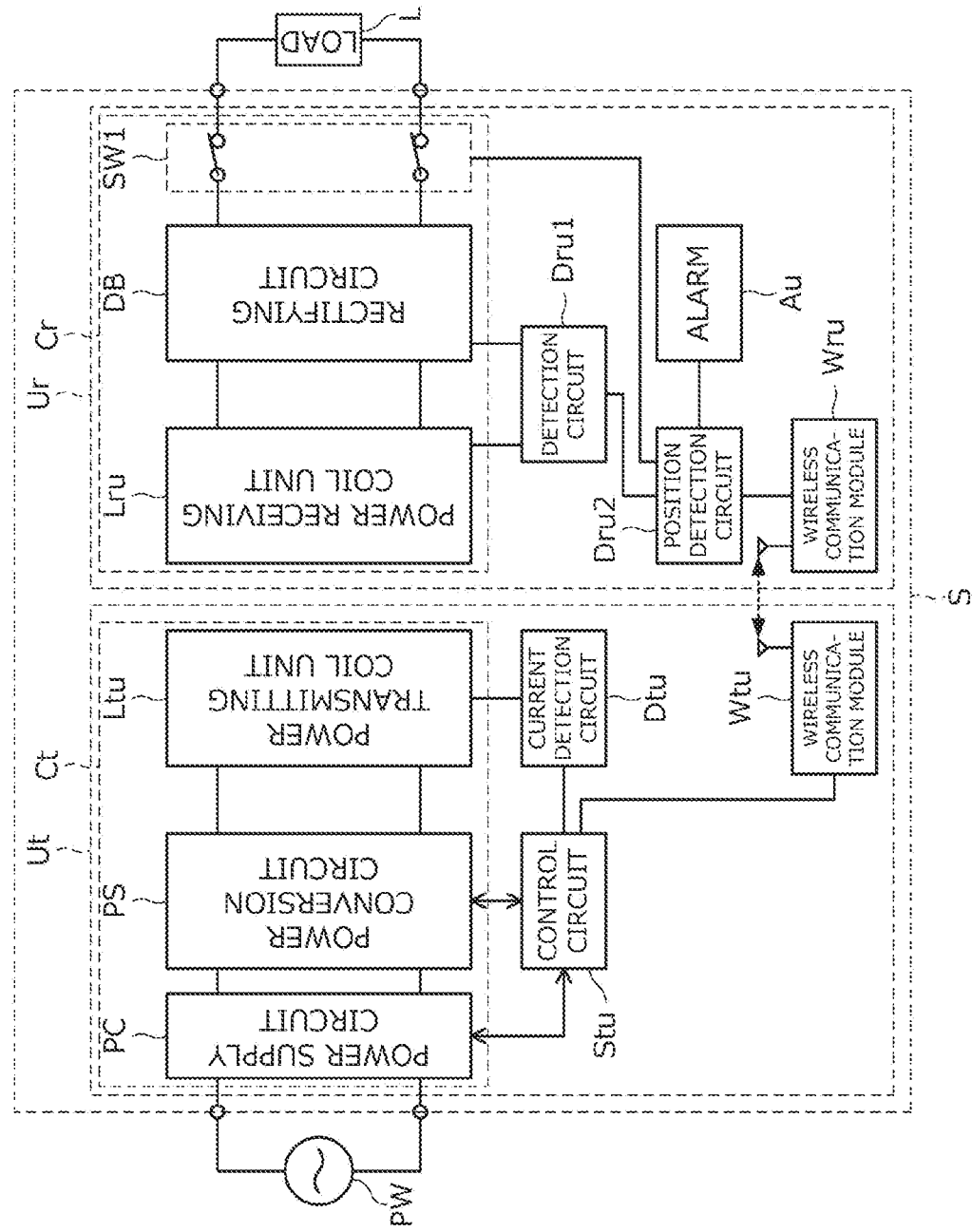
FIG. 7 is a view illustrating the configuration of a wireless power transmission system S according to a second embodiment of the present invention.

FIG. 7 is a view illustrating the configuration of a wireless power transmission system S according to a second embodiment of the present invention. The wireless power transmission system S of the present embodiment differs from the wireless power transmission system S according to the first embodiment in that the wireless power receiving device Ur has a switching circuit SW1 in the power receiving circuit Cr. The same parts as those in the first embodiment are denoted by the same reference numerals, and different points from those of the first embodiment will mainly be described.

The switching circuit SW1 is a circuit for switching a connection state between the output end of the rectifying circuit DB and the load L. Specifically, the switching circuit SW1 is configured to switch between a state where the output end of the rectifying circuit DB is connected to the load L and a state where the output end of the rectifying circuit DB is opened.

The position detection circuit Drug according to the present embodiment controls the switching circuit SW1 so as to open the output end of the rectifying circuit DB during the processing of FIG. 5. Otherwise, the output end of the rectifying circuit DB is connected to the load L. This can make the circuit characteristic value (value detected by the detection circuit Dru1) of the power receiving circuit Cr independent of the load L, so that the position detection circuit Dru2 can perform comparison between the threshold values T1, T2 and the circuit characteristic value and the calculation of the transmittable power with higher accuracy.

Figure 8:
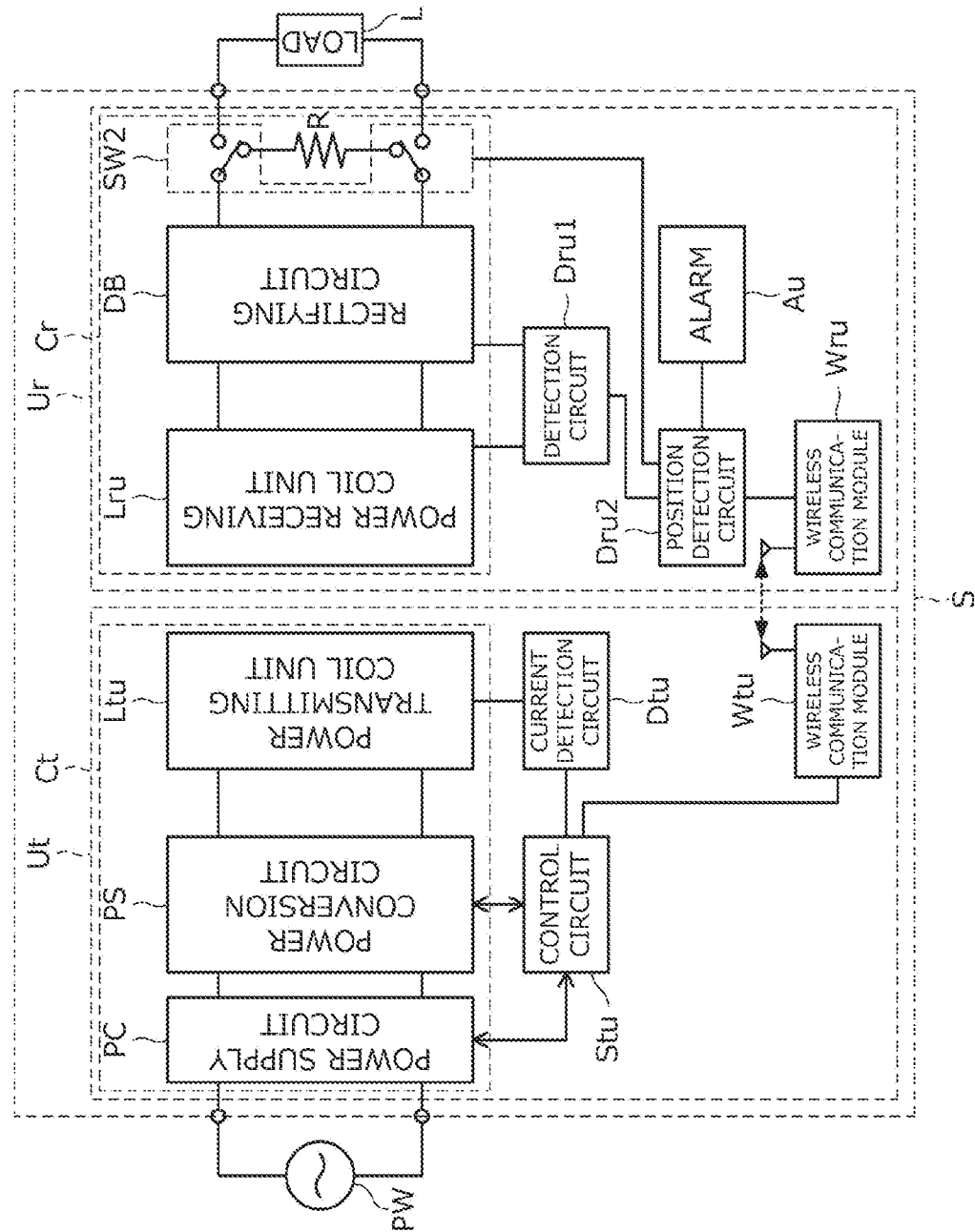
FIG. 8 is a view illustrating the configuration of a wireless power transmission system S according to a third embodiment of the present invention.

FIG. 8 is a view illustrating the configuration of a wireless power transmission system S according to a third embodiment of the present invention. The wireless power transmission system S of the present embodiment differs from the wireless power transmission system S according to the second embodiment in that it has a switching circuit SW2 in place of the switching circuit SW1. The same parts as those in the second embodiment are denoted by the same reference numerals, and different points from those of the second embodiment will mainly be described.

The switching circuit SW2 is configured to switch a connection state between the output end of the rectifying circuit DB and the load L and, hence, is the same as the switching circuit SW1 but differs therefrom in that the output end of the rectifying circuit DB in a state where it is not connected to the load L is connected to a load resistance R having a fixed resistance value.

The position detection circuit Dru2 according to the present embodiment controls the switching circuit SW2 so as to connect the output end of the rectifying circuit DB to the load resistance R during the processing of FIG. 5. Otherwise, the output end of the rectifying circuit DB is connected to the load L. This can make the circuit characteristic value (value detected by the detection circuit Dru1) of the power receiving circuit Cr independent of the load L as in the second embodiment, so that the position detection circuit Dru2 can perform comparison between the threshold values T1, T2 and the circuit characteristic value and the calculation of the transmittable power with higher accuracy as in the second embodiment.

Figure 9:
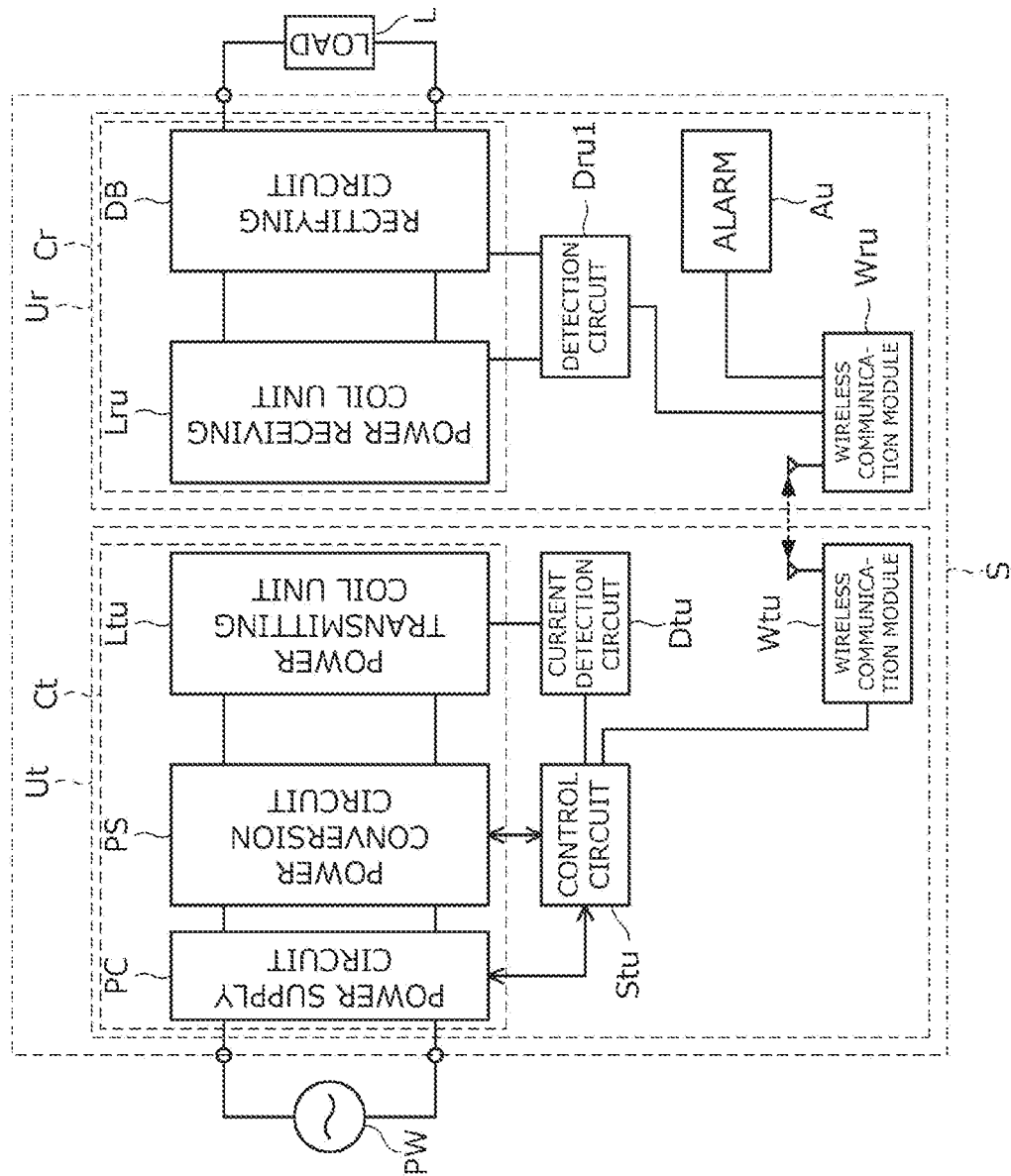
FIG. 9 is a view illustrating the configuration of a wireless power transmission system S according to a fourth embodiment of the present invention.

FIG. 9 is a view illustrating the configuration of a wireless power transmission system S according to a fourth embodiment of the present invention. The wireless power transmission system S of the present embodiment differs from the wireless power transmission system S according to the first embodiment in that the control circuit Stu in the wireless power transmitting device Ut has a function corresponding to the position detection circuit Dru2 and that the position detection circuit Dru2 is not provided in the wireless power receiving device Ur. The same parts as those in the first embodiment are denoted by the same reference numerals, and different points from those of the first embodiment will mainly be described.

The detection circuit Dru1 according to the present embodiment is configured to execute, from among the functions of the position detection circuit Dru2 described in the first embodiment, a function of transmitting by wireless the circuit characteristic value (e.g., output voltage of the rectifying circuit DB) of the power receiving circuit Cr in response to a request from the control circuit Stu in place of the position detection circuit Dru2.

The control circuit Stu according to the present embodiment executes, based on the circuit characteristic value received from the detection circuit Dru1, the same processing as that performed by the position detection circuit Dru2 in the first embodiment. Specifically, when the circuit characteristic value detected by the detection circuit Dru1 exceeds the threshold value T1, the control circuit Stu determines that the power receiving coil exists near the periphery of a position suitable for receiving power from the power transmitting coil. Then, when the circuit characteristic value detected by the detection circuit Dru1 exceeds the threshold value T2, the control circuit Stu calculates the transmittable power to the wireless power receiving device Ur based on the circuit characteristic value detected by the detection circuit Dru1. The processing to be performed here by the control circuit Stu is as described above, so descriptions thereof will be omitted. The content of the notification by the alarm Au is also as described above in the first embodiment, and the control circuit Stu controls the alarm Au through the wireless communication modules Wtu and Wru.

As described above, with the wireless power transmission system S in the present embodiment, the processing performed by the wireless power transmitting device Ut side allows approach to the wireless power transmitting device Ut to be notified to the user at a time point when the circuit characteristic value exceeds the threshold value T1 (that is, when the wireless power receiving device Ur is located at a position farther than the conventional notification start position with respect to the wireless power transmitting device Ut) in a state where the wireless power receiving device Ur is approaching the wireless power transmitting device Ut.

It is apparent that the present invention is not limited to the above embodiments, but may be modified and changed without departing from the scope and spirit of the invention.

For example, in the above embodiments, the vehicle Ve is exemplified as a power transmission destination; however, the present invention may be suitably applied to a case where mobile bodies other than the vehicle Ve are set as the power transmission destination. For example, the present invention may be suitably applied to a case where a mobile device such as a tablet terminal or a smartphone is set as the power transmission destination.

Further, in the above embodiments, the vertical separation distance Z is transmitted from the wireless power transmitting device Ut to the wireless power receiving device Ur; however, when the bottom face height of the vehicle Ve is previously known, the wireless power receiving device Ur may acquire the vertical separation distance Z from the bottom face height of the vehicle Ve. In this case, the position detection circuit Dru2 described in the first to third embodiments can change the threshold value T2 in accordance with the vertical separation distance Z without the necessity of receiving the vertical separation distance Z from the wireless power transmitting device Ut. The bottom face height of the vehicle Ve does not generally vary, so that the processing of changing the threshold value T2 may be executed only once in response to the acquisition of the vertical separation distance Z by the wireless power receiving device Ur.

Further, in the above embodiments, the alarm Au is provided only in the wireless power receiving device Ur; however, an alarm may be provided also in the wireless power transmitting device Ut and configured to perform notification operation at the same timing with the alarm Au in the wireless power receiving device Ur. In this case, the position detection circuit Dru2 may control the alarm in the wireless power transmitting device Ut through wireless communication between the wireless communication modules Wtu and Wru illustrated in FIG. 8.

As described above, according to the present embodiment, there is provided a wireless power receiving device according to the present embodiment is a device that is mounted in a mobile body and configured to receive power transmitted from a wireless power transmitting device by wireless. The wireless power receiving device includes a power receiving circuit including a power receiving coil that takes in AC power through a magnetic field and a rectifying circuit that converts the AC power received by the power receiving coil into DC power and outputs the DC power to a load, a detection circuit that detects a circuit characteristic value of the power receiving circuit having a first peak having a relatively large peak value and a second peak having a relatively small value with respect to a horizontal separation distance between the power transmitting coil of the wireless power transmitting device and the power receiving coil, and a position detection circuit that detects a state of the relative position between the power receiving coil and the power transmitting coil. When the circuit characteristic value detected by the detection circuit exceeds a first threshold value set between the peak value of the second peak and a detection limit value of the detection circuit, the position detection circuit determines that the power receiving coil exists near the periphery of a position suitable for receiving power from the power transmitting coil. When the circuit characteristic value detected by the detection circuit exceeds a second threshold value set between the peak value of the second peak and the peak value of the first peak, the position detection circuit calculates transmittable power from the wireless power transmitting device based on the circuit characteristic value detected by the detection circuit.

According to the present embodiment, processing for starting power transmission (that is, processing of calculating the transmittable power from the wireless power transmitting device based on the circuit characteristic value) is started after the circuit characteristic value exceeds the second threshold value, so that, in a state where the wireless power receiving device is approaching the wireless power transmitting device, it is possible to notify the user of approach to the wireless power transmitting device at a time point when the circuit characteristic value exceeds the first threshold value (that is, when the wireless power receiving device is located at a position farther than the conventional notification start position with respect to the wireless power transmitting device).

In the wireless power receiving device, the first threshold value may be a detection limit value of the detection circuit. With this configuration, it is possible to widen a range where approach to the wireless power transmitting device can be notified to the user to a maximum extent.

In the wireless power receiving device, the position detection circuit may change the second threshold value in accordance with a vertical distance between the power transmitting coil and the power receiving coil. Concrete peak values of the respective first and second peaks are reduced as the vertical distance between the power transmitting coil and the power receiving coil increases. According to the present embodiment, it is possible to allow the second threshold value to adapt to a change in the peak value of the second peak. As a result, it is possible to widen a range where transmittable power from the wireless power transmitting device can be acquired to a maximum extent.

In the wireless power receiving device, the position detection circuit may determine that alignment between the power transmitting coil and the power receiving coil is not performed properly when the circuit characteristic value detected by the detection circuit does not exceed the second threshold value within a predetermined time period from when it exceeds the first threshold value. This allows a user to grasp that alignment between the power transmitting coil and the power receiving coil fails.

In the wireless power receiving device, the position detection circuit may determine that alignment between the power transmitting coil and the power receiving coil is not performed properly when the circuit characteristic value detected by the detection circuit does not exceed the second threshold value during a time period from when it exceeds the first threshold value to when the mobile body is moved by a predetermined distance. This also allows a user to grasp that alignment between the power transmitting coil and the power receiving coil fails.

The wireless power receiving device may further include a power receiving side alarm that notifies a user or an external device of information. The power receiving side alarm may notify the user or external device of a determination result of the position detection circuit and the transmittable power calculated by the position detection circuit. This allows the user or external device to guide the mobile body to a position where the power transmitting device and the power receiving device directly face each other.

In the wireless power receiving device, the power receiving circuit may further include a switching circuit switching a connection state between the output end of the rectifying circuit and the load. The switching circuit may open the output end of the rectifying circuit during processing of the position detection circuit. This can make the circuit characteristic value of the power receiving circuit independent of the load, so that the position detection circuit can perform comparison between the first and second threshold values and the circuit characteristic value and the calculation of the transmittable power with higher accuracy.

In the wireless power receiving device, the power receiving circuit may further include a load resistance having a fixed resistance value and a switching circuit switching a connection state between the output end of the rectifying circuit and the load or the load resistance. The switching circuit may connect the output end of the rectifying circuit to the load resistance during processing of the position detection circuit. This also can make the circuit characteristic value of the power receiving circuit independent of the load, so that the position detection circuit can perform comparison between the first and second threshold values and the circuit characteristic value and the calculation of the transmittable power with higher accuracy.

A wireless power transmission system according to the present embodiment is a system that transmits power from a wireless power transmitting device to a wireless power receiving device by wireless, wherein the wireless power transmitting device includes a power conversion circuit that converts input DC power into AC power, a power transmitting coil that receives the AC power supplied from the power conversion circuit to generate an AC magnetic field, and a control circuit that controls the AC power to be supplied to the power transmitting coil, and the wireless power receiving device is any one of the above wireless power receiving devices.

In the wireless power transmission system, the control circuit may control the AC power to be supplied to the power transmitting coil to control the amount of magnetic flux generated from the power transmitting coil constant. Thus, processing of the position detection circuit can be suitably performed.

A wireless power transmission system according to another aspect of the present embodiment is a system that transmits power from a wireless power transmitting device to a wireless power receiving device by wireless, wherein the wireless power transmitting device includes a power conversion circuit that converts input DC power into AC power, a power transmitting coil that receives the AC power supplied from the power conversion circuit to generate an AC magnetic field, and a control circuit that controls the AC power to be supplied to the power transmitting coil, and the wireless power receiving device includes a power receiving circuit including a power receiving coil that takes in AC power through the AC magnetic field and a rectifying circuit that converts the AC power received by the power receiving coil into DC power and outputs the DC power to a load, and a detection circuit that detects a circuit characteristic value of the power receiving circuit having a first peak having a relatively large peak value and a second peak having a relatively small value with respect to a horizontal separation distance between the power transmitting coil of the wireless power transmitting device and the power receiving coil. When the circuit characteristic value detected by the detection circuit exceeds a first threshold value set between the peak value of the second peak and a detection limit value of the detection circuit, the control circuit determines that the power receiving coil exists near the periphery of a position suitable for receiving power from the power transmitting coil. When the circuit characteristic value detected by the detection circuit exceeds a second threshold value set between the peak value of the second peak and the peak value of the first peak, the control circuit calculates transmittable power from the wireless power transmitting device to the wireless power receiving device based on the circuit characteristic value detected by the detection circuit.

According to the present embodiment, in a state where the wireless power receiving device is approaching the wireless power transmitting device, approach to the wireless power transmitting device can be notified to a user at a time point when the circuit characteristic value exceeds the first threshold value (that is, when the wireless power receiving device is located at a position farther than the conventional notification start position with respect to the wireless power transmitting device).

What is claimed is:

1. A wireless power receiving device that is mounted in a mobile body and configured to receive power transmitted from a wireless power transmitting device by wireless, the wireless power receiving device comprising:
   a power receiving circuit including a power receiving coil that takes in AC power through a magnetic field and a rectifying circuit that converts the AC power received by the power receiving coil into DC power and outputs the DC power to a load;
   a detection circuit that detects a circuit characteristic value of the power receiving circuit having a first peak having a relatively large peak value and a second peak having a relatively small value with respect to a horizontal separation distance between a power transmitting coil of the wireless power transmitting device and the power receiving coil; and
   a position detection circuit that detects a state of the relative position between the power receiving coil and the power transmitting coil, the position detection circuit determining that the power receiving coil exists near the periphery of a position suitable for receiving power from the power transmitting coil when the circuit characteristic value detected by the detection circuit exceeds a first threshold value set between the peak value of the second peak and a detection limit value of the detection circuit, calculating transmittable power from the wireless power transmitting device based on the circuit characteristic value detected by the detection circuit, when the circuit characteristic value detected by the detection circuit exceeds a second threshold value set between the peak value of the second peak and the peak value of the first peak, and changing the second threshold value in accordance with a vertical distance between the power transmitting coil and the power receiving coil.

2. The wireless power receiving device as claimed in claim 1, wherein the first threshold value is a detection limit value of the detection circuit.

3. The wireless power receiving device as claimed in claim 1, wherein the position detection circuit determines that alignment between the power transmitting coil and the power receiving coil is not performed properly when the circuit characteristic value detected by the detection circuit does not exceed the second threshold value within a predetermined time period from when the circuit characteristic value exceeds the first threshold value.

4. The wireless power receiving device as claimed in claim 1, wherein the position detection circuit determines that alignment between the power transmitting coil and the power receiving coil is not performed properly when the circuit characteristic value detected by the detection circuit does not exceed the second threshold value during a time period from when the circuit characteristic value exceeds the first threshold value to when the mobile body is moved by a predetermined distance.

5. The wireless power receiving device as claimed in claim 1, further comprising a power receiving side alarm that notifies a user or an external device of information, the power receiving side alarm notifying the user or external device of a determination result of the position detection circuit and the transmittable power calculated by the position detection circuit.

6. The wireless power receiving device as claimed in claim 1, further comprising a switching circuit switching a connection state between the output end of the rectifying circuit and the load, the switching circuit opening the output end of the rectifying circuit during processing of the position detection circuit.

7. The wireless power receiving device as claimed in claim 1, wherein
the power receiving circuit further includes a load resistance having a fixed resistance value and a switching circuit switching a connection state between the output end of the rectifying circuit and the load or the load resistance, wherein
the switching circuit connects the output end of the rectifying circuit to the load resistance during processing of the position detection circuit.

8. A wireless power transmission system that transmits power from the wireless power transmitting device of claim 1 to a wireless power receiving device by wireless, wherein
the wireless power transmitting device includes:
a power conversion circuit that converts input DC power into AC power;
a power transmitting coil that receives the AC power supplied from the power conversion circuit to generate an AC magnetic field; and
a control circuit that controls the AC power to be supplied to the power transmitting coil.

9. The wireless power transmission system as claimed in claim 8, wherein the control circuit controls the AC power to be supplied to the power transmitting coil to control the amount of magnetic flux generated from the power transmitting coil constant.

10. A wireless power transmission system that transmits power from a wireless power transmitting device to a wireless power receiving device by wireless, wherein
the wireless power transmitting device includes:
a power conversion circuit that converts input DC power into AC power;
a power transmitting coil that receives the AC power supplied from the power conversion circuit to generate an AC magnetic field; and
a control circuit that controls the AC power to be supplied to the power transmitting coil, and
the wireless power receiving device includes:
a power receiving circuit including a power receiving coil that takes in AC power through the AC magnetic field and a rectifying circuit that converts the AC power received by the power receiving coil into DC power and outputs the DC power to a load; and
a detection circuit that detects a circuit characteristic value of the power receiving circuit having a first peak having a relatively large peak value and a second peak having a relatively small value with respect to a horizontal separation distance between the power transmitting coil of the wireless power transmitting device and the power receiving coil,
wherein the control circuit
determines that the power receiving coil exists near the periphery of a position suitable for receiving power from the power transmitting coil when the circuit characteristic value detected by the detection circuit exceeds a first threshold value set between the peak value of the second peak and a detection limit value of the detection circuit, and
calculates transmittable power from the wireless power transmitting device to the wireless power receiving device based on the circuit characteristic value detected by the detection circuit when the circuit characteristic value detected by the detection circuit exceeds a second threshold value set between the peak value of the second peak and the peak value of the first peak, and
changes the second threshold value in accordance with a vertical distance between the power transmitting coil and the power receiving coil.

11. A wireless power receiving device that is mounted in a mobile body and configured to receive power transmitted from a wireless power transmitting device by wireless, the wireless power receiving device comprising:
a power receiving circuit including a power receiving coil that takes in AC power through a magnetic field and a rectifying circuit that converts the AC power received by the power receiving coil into DC power and outputs the DC power to a load;
a detection circuit that detects a circuit characteristic value of the power receiving circuit having a first peak having a relatively large peak value and a second peak having a relatively small value with respect to a horizontal separation distance between a power transmitting coil of the wireless power transmitting device and the power receiving coil; and
a position detection circuit that detects a state of the relative position between the power receiving coil and the power transmitting coil, the position detection circuit determining that the power receiving coil exists near the periphery of a position suitable for receiving power from the power transmitting coil when the circuit characteristic value detected by the detection circuit exceeds a first threshold value set between the peak value of the second peak and a detection limit value of the detection circuit, calculating transmittable power from the wireless power transmitting device based on the circuit characteristic value detected by the detection circuit, when the circuit characteristic value detected by the detection circuit exceeds a second threshold value set between the peak value of the second peak and the peak value of the first peak, and determining that alignment between the power transmitting coil and the power receiving coil is not performed properly when the circuit characteristic value detected by the detection circuit does not exceed the second threshold value within a predetermined time period from when the circuit characteristic value exceeds the first threshold value.

12. The wireless power receiving device as claimed in claim 11, wherein the first threshold value is a detection limit value of the detection circuit.

13. The wireless power receiving device as claimed in claim 11, wherein the position detection circuit determines that alignment between the power transmitting coil and the power receiving coil is not performed properly when the circuit characteristic value detected by the detection circuit does not exceed the second threshold value during a time period from when the circuit characteristic value exceeds the first threshold value to when the mobile body is moved by a predetermined distance.

14. The wireless power receiving device as claimed in claim 11, further comprising a power receiving side alarm that notifies a user or an external device of information, the power receiving side alarm notifying the user or external device of a determination result of the position detection circuit and the transmittable power calculated by the position detection circuit.

15. The wireless power receiving device as claimed in claim 11, further comprising a switching circuit switching a connection state between the output end of the rectifying circuit and the load, the switching circuit opening the output end of the rectifying circuit during processing of the position detection circuit.

16. The wireless power receiving device as claimed in claim 11,
 wherein the power receiving circuit further includes a load resistance having a fixed resistance value and a switching circuit switching a connection state between the output end of the rectifying circuit and the load or the load resistance, and
 wherein the switching circuit connects the output end of the rectifying circuit to the load resistance during processing of the position detection circuit.

17. A wireless power transmission system that transmits power from the wireless power transmitting device as claimed in claim 11 to a wireless power receiving device by wireless, wherein
 the wireless power transmitting device includes:
 a power conversion circuit that converts input DC power into AC power;
 a power transmitting coil that receives the AC power supplied from the power conversion circuit to generate an AC magnetic field;
 a control circuit that controls the AC power to be supplied to the power transmitting coil.

18. The wireless power transmission system as claimed in claim 17, wherein the control circuit controls the AC power to be supplied to the power transmitting coil to control the amount of magnetic flux generated from the power transmitting coil constant.

19. A wireless power transmission system that transmits power from a wireless power transmitting device to a wireless power receiving device by wireless, wherein
 the wireless power transmitting device includes:
 a power conversion circuit that converts input DC power into AC power;
 a power transmitting coil that receives the AC power supplied from the power conversion circuit to generate an AC magnetic field; and
 a control circuit that controls the AC power to be supplied to the power transmitting coil, and
 the wireless power receiving device includes:
 a power receiving circuit including a power receiving coil that takes in AC power through the AC magnetic field and a rectifying circuit that converts the AC power received by the power receiving coil into DC power and outputs the DC power to a load; and
 a detection circuit that detects a circuit characteristic value of the power receiving circuit having a first peak having a relatively large peak value and a second peak having a relatively small value with respect to a horizontal separation distance between the power transmitting coil of the wireless power transmitting device and the power receiving coil,
 wherein the control circuit
 determines that the power receiving coil exists near the periphery of a position suitable for receiving power from the power transmitting coil when the circuit characteristic value detected by the detection circuit exceeds a first threshold value set between the peak value of the second peak and a detection limit value of the detection circuit,
 calculates transmittable power from the wireless power transmitting device to the wireless power receiving device based on the circuit characteristic value detected by the detection circuit when the circuit characteristic value detected by the detection circuit exceeds a second threshold value set between the peak value of the second peak and the peak value of the first peak, and
 determines that alignment between the power transmitting coil and the power receiving coil is not performed properly when the circuit characteristic value detected by the detection circuit does not exceed the second threshold value within a predetermined time period from when the circuit characteristic value exceeds the first threshold value.

\* \* \* \* \*